United States Patent
Wang et al.

(10) Patent No.: US 10,831,510 B2
(45) Date of Patent: Nov. 10, 2020

(54) METHOD TO DESIGN AND TEST WORKFLOWS

(71) Applicant: International Business Machines Corporation, Armonk, NY (US)

(72) Inventors: Qingda Wang, Richmond Hill (CA); Kinson Chik, Markham (CA); Jia Xin Gao, Xi'an (CN); Qiang Jia, Xi'an (CN); Dang Peng Liu, Xi'an (CN); Yi Min Zhang, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 16/029,310

(22) Filed: Jul. 6, 2018

(65) Prior Publication Data

US 2020/0012532 A1 Jan. 9, 2020

(51) Int. Cl.
| G06F 9/448 | (2018.01) |
| G06F 9/48 | (2006.01) |
| G06F 9/52 | (2006.01) |
| G06F 11/36 | (2006.01) |

(52) U.S. Cl.
CPC .......... G06F 9/4498 (2018.02); G06F 9/4843 (2013.01); G06F 9/52 (2013.01); G06F 11/3612 (2013.01)

(58) Field of Classification Search
CPC ........ G06F 9/52; G06F 9/4853; G06F 9/5083; G06F 9/4998; G06F 11/3612
See application file for complete search history.

(56) References Cited

U.S. PATENT DOCUMENTS

| 9,170,821 B1 | 10/2015 | Palaniappan et al. |
| 2006/0195817 A1 | 8/2006 | Moon |
| 2008/0244565 A1* | 10/2008 | Levidow ............... G06F 9/5038 717/176 |
| 2012/0016713 A1 | 1/2012 | Wilcock et al. |
| 2013/0158964 A1 | 6/2013 | Hall et al. |
| 2016/0004622 A1 | 1/2016 | Kaulgud et al. |
| 2016/0313874 A1* | 10/2016 | Mikheev ................. G06F 16/26 |
| 2017/0315714 A1* | 11/2017 | Shyamsundar ....... G06F 3/0482 |
| 2018/0052666 A1 | 2/2018 | Zhang et al. |
| 2019/0005228 A1* | 1/2019 | Singh ..................... G06F 21/53 |

FOREIGN PATENT DOCUMENTS

| EP | 2023278 A1 | 2/2009 |
| EP | 2124176 A1 | 11/2009 |

OTHER PUBLICATIONS

S. Deng, Z. Yu, Z. Wu, H. Lican, Enhancement of workflow flexibility by composing activities at run-time, in: ACM SAC '04, 2004, pp. 667-673 (Year: 2004).*
X. Xiang et al., "Improving the Reuse of ScientificWorkflows and Their By-products", IEEE International Conference on Web Services (ICWS 2007), Jul. 9-13, 2007, pp. 1-8.

* cited by examiner

*Primary Examiner* — Jacob D Dascomb
(74) *Attorney, Agent, or Firm* — Kunzler Bean & Adamson

(57) ABSTRACT

For workflow test, a processor executes a workflow instance. The workflow instance includes a first workflow description of step names for a plurality of jobs. The processor further receives a modification to the first workflow description as the workflow instance executes. In addition, the processor synchronizes the modified workflow description to the executing workflow instance as the workflow instance executes. A workflow context of the executing workflow instance is preserved.

17 Claims, 8 Drawing Sheets

110

| Workflow Identifier 201 |
|---|
| Workflow Step 203 |
| Workflow Step 203 |
| Workflow Step 203 |
| Workflow Step 203 |

METHOD TO DESIGN AND TEST WORKFLOWS

FIELD

The subject matter disclosed herein relates to workflows and more particularly relates to workflow design and test.

BACKGROUND

Workflows may execute for many hours, so that modifications can be difficult to test.

BRIEF SUMMARY

An apparatus for workflow test is disclosed. The apparatus includes a processor and a computer-readable storage media storing code executable by the processor. The processor executes a workflow instance. The workflow instance includes a first workflow description of step names for a plurality of jobs. The processor further receives a modification to the first workflow description as the workflow instance executes. In addition, the processor synchronizes the modified workflow description to the executing workflow instance as the workflow instance executes. A workflow context of the executing workflow instance is preserved. A method and computer program product also perform the functions of the method.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
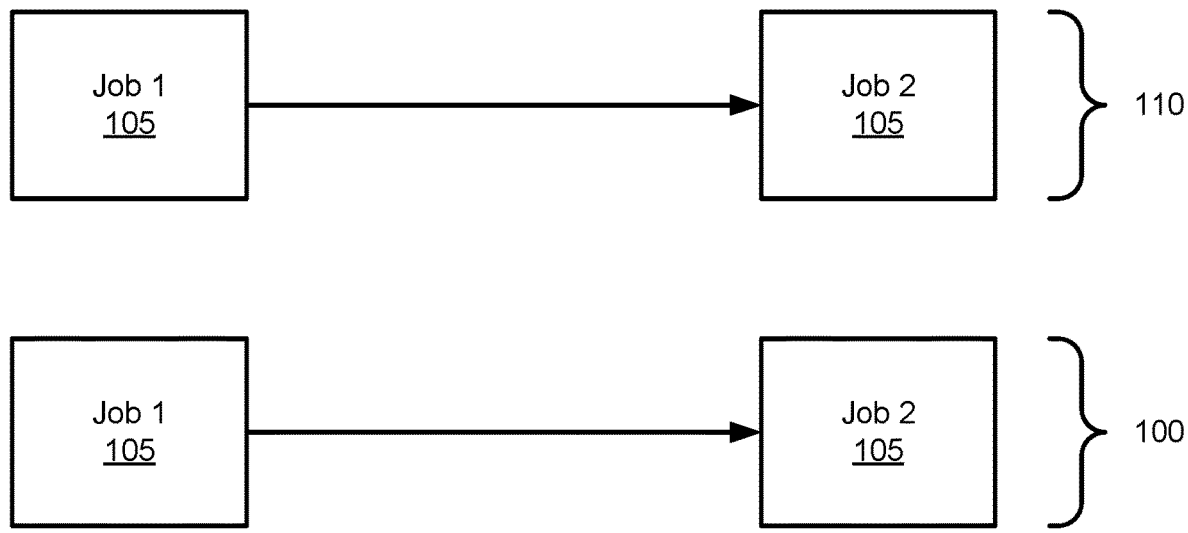
FIG. 1A is a schematic block diagram illustrating one embodiment of a workflow description and a workflow instance.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The computer program product may be deployed by manually loading directly in the client, server and proxy computers via loading a computer readable storage medium such as a CD, DVD, etc., the computer program product may be automatically or semi-automatically deployed into a computer system by sending the computer program product to a central server or a group of central servers. The computer program product is then downloaded into the client computers that will execute the computer program product. Alternatively the computer program product is sent directly to the client system via e-mail. The computer program product is then either detached to a directory or loaded into a directory by a button on the e-mail that executes a program that detaches the computer program product into a directory. Another alternative is to send the computer program product directly to a directory on the client computer hard drive. When there are proxy servers, the process will, select the proxy server code, determine on which computers to place the proxy servers' code, transmit the proxy server code, then install the proxy server code on the proxy computer. The computer program product will be transmitted to the proxy server and then it will be stored on the proxy server.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

FIG. 1A is a schematic block diagram illustrating one embodiment of a workflow description 110 and a workflow instance 100. The workflow description 110 describes a plurality of jobs 105. The jobs 105 are steps in the workflow description 110. The plurality of jobs 105 have one or more interdependencies. For example, in the depicted embodiment, job 1 105 is executed before job 2 105. The workflow description 110 is executed as the workflow instance 100.

The workflow instance 100 and workflow description 110 often include many jobs 105. As a result, the execution time for the workflow instance 100 can be very long. Unfortunately, when a job 105 is added to a step in the workflow description 110 or modified, rerunning the workflow instance 100 from the beginning is impractical and inefficient. However, individual jobs 105 cannot be efficiently tested outside of the context of the workflow instance 100.

In the past, development systems have required the rerunning of the workflow instance 100 in order to effectively test a modified workflow description 110 and/or new and/or modify jobs 105. The embodiments described herein synchronize a modified workflow description 110 to the executing workflow instance 100 as the workflow instance 100 executes, allowing for the efficient test of workflow modifications as will be described hereafter.

Figure 1B:
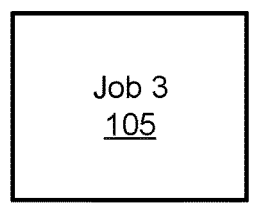
FIG. 1B is a schematic block diagram illustrating one embodiment of a workflow job.

FIG. 1B is a schematic block diagram illustrating one embodiment of a workflow job 105. In one embodiment, the job 105, designated job 3 105, is added to the workflow description 110 and the workflow instance 105 of FIG. 1A in order to test job 3 105 was will be described hereafter in FIG. 3A.

Figure 2:
FIG. 2 is a schematic block diagram illustrating one embodiment of a workflow description.

FIG. 2 is a schematic block diagram illustrating one embodiment of a workflow description 110. In one embodiment, the workflow description 110 is organized as a data structure and/or text file in a memory. In the depicted embodiment, the workflow description 110 includes a workflow identifier 201 and one or more workflow steps 203. Each workflow step 203 identifies a job 105. In a certain embodiment, the workflow identifier 201 of the workflow description 110 is also the workflow identifier 201 of a modified workflow description 110. In one embodiment, each workflow step 203 includes a step name of a job 105 that is unique within the workflow definition 110.

Figure 3A:
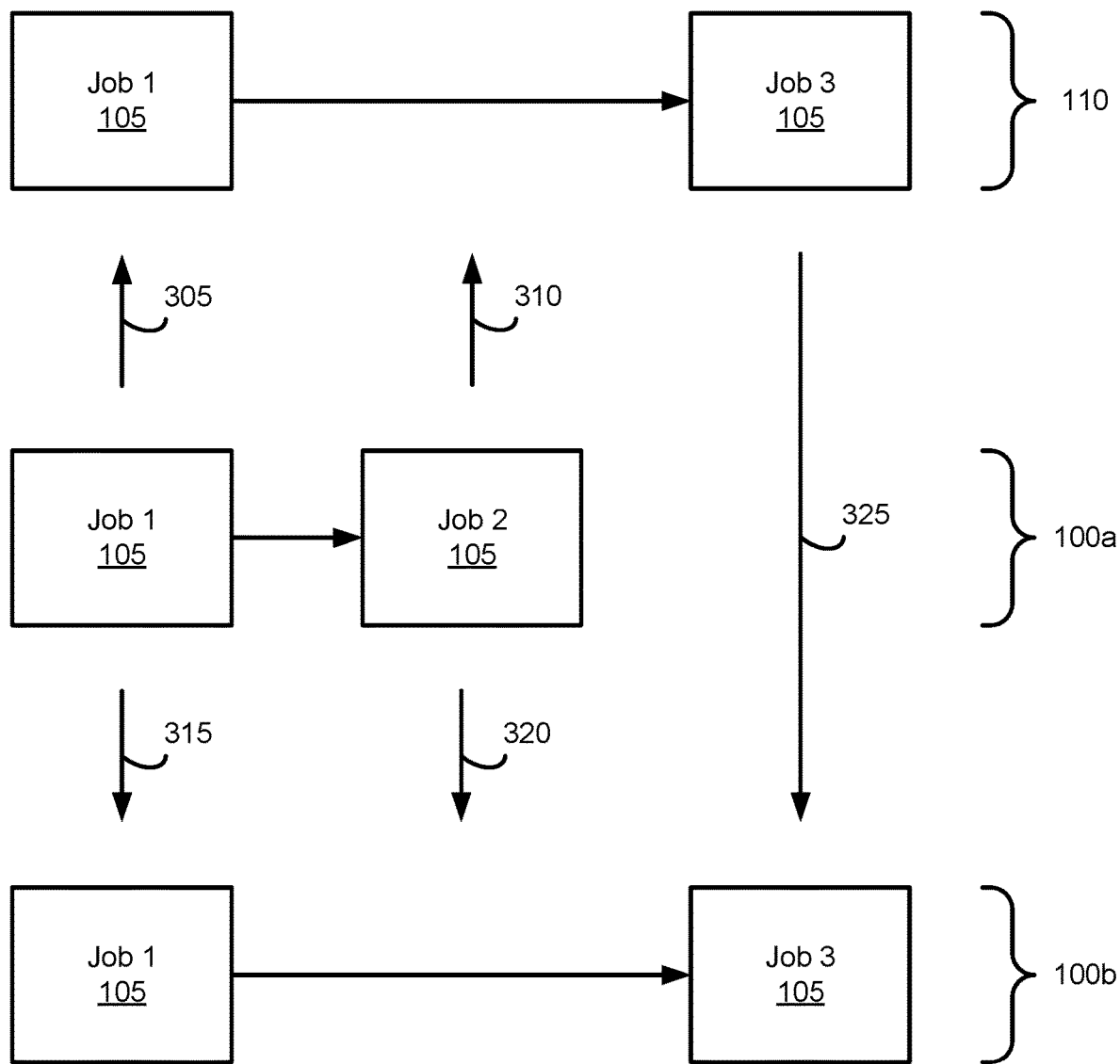
FIG. 3A is a schematic block diagram illustrating one embodiment of a workflow test.

FIG. 3A is a schematic block diagram illustrating one embodiment of a workflow test. In the depicted embodiment, the workflow description 110 of FIG. 1A is modified to replace job 2 105 with job 3 105 of FIG. 1B. For example, a user may replace job 2 105 with job 3 105 in a workflow step 203 of the workflow description 110. The embodiments modify a pre-synchronization workflow instance 100a with the modified workflow description 110 to generate a synchronized workflow instance 100b.

The embodiments determines that job 1 105 of the pre-synchronization workflow instance 100a is found 305 in the modified workflow description 110. As a result, the embodiments keep 315 job 1 105 in the synchronized workflow instance 100b.

The embodiments further determine that job 2 105 is not found 310 in the modified workflow description 110. As a result, the embodiments kill and remove 320 job 2 105 from the synchronized workflow instance 100b.

The embodiments may determine that job 3 105 is new 325. As a result, job 3 is added to the synchronized workflow instance 100b. In one embodiment, job 3 105 waits to execute until job 1 completes. Job 3 then executes in the full context of the workflow instance 100. As a result, job 3 105 is fully tested without rerunning job 1 105.

The modified workflow description 110 is synchronized to the executing workflow instance 100. The context of the executing workflow instance 100 is preserved by reusing the executing workflow instance 100.

Figure 3B:
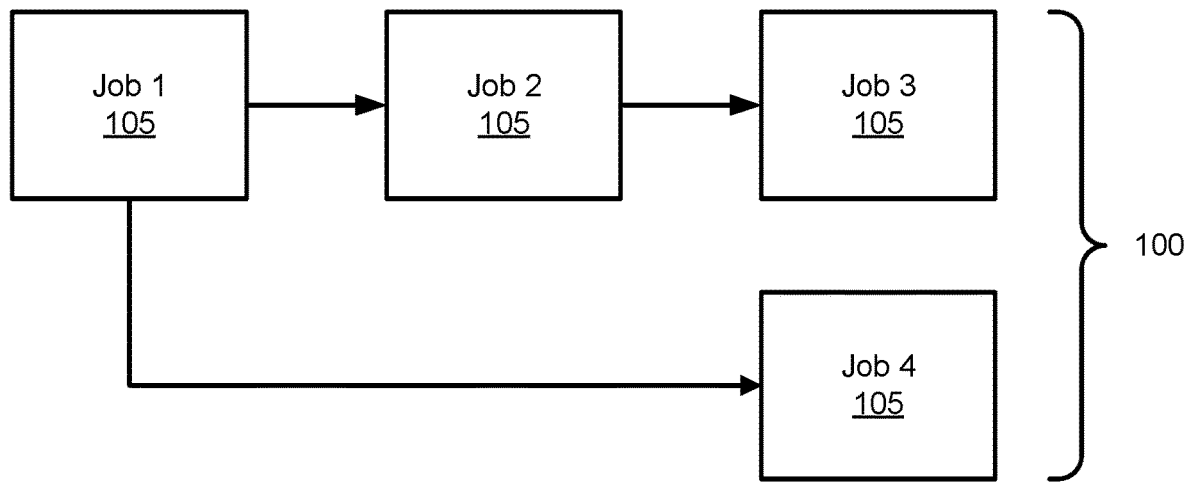
FIGS. 3B-D are schematic block diagrams illustrating one alternate embodiment of a workflow test.
Figure 3C:
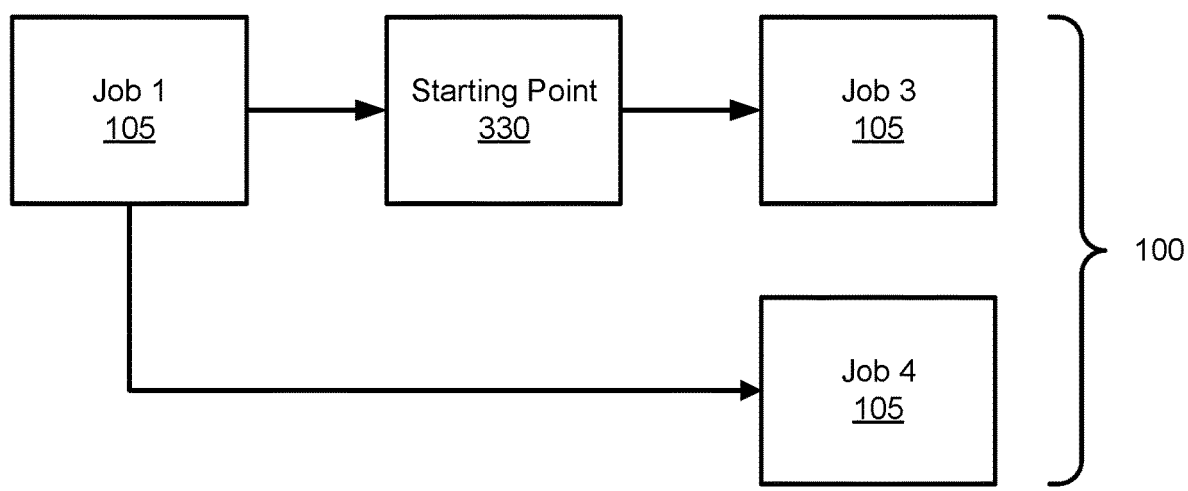
Figure 3D:
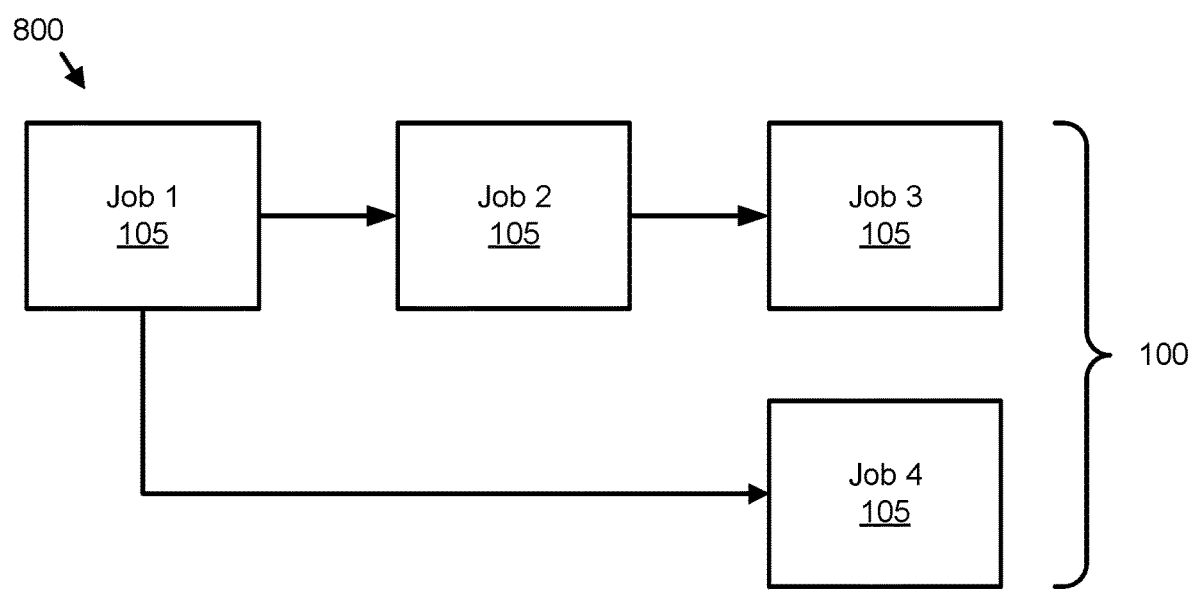

FIGS. 3B-D are schematic block diagrams illustrating one alternate embodiment of a workflow test. In the depicted embodiment, a workflow instance 100 is shown with four jobs 105. The interdependencies between the jobs 105 are illustrated with arrows.

In an exemplary embodiment, job 3 105 is modified in FIG. 3B. In one embodiment, a starting point 330 is set for job 2 105 as shown in FIG. 3C. The user and/or a processor may set the starting point 330. The starting point 330 may specify where to begin rerunning the workflow instance 100.

The modified job 3 105 is synchronized to the workflow instance 100. In one embodiment, the original job 3 105 is removed from the workflow instance 100 and the modified job 3 105 is added to the workflow instance to synchronize job 2 105 to the workflow instance 100. Modified job 3 105 waits to execute. Subsequent to the synchronization, the workflow instance 100 returns from the starting point 330 and executes job 3 105 as shown in FIG. 3D.

Figure 4:
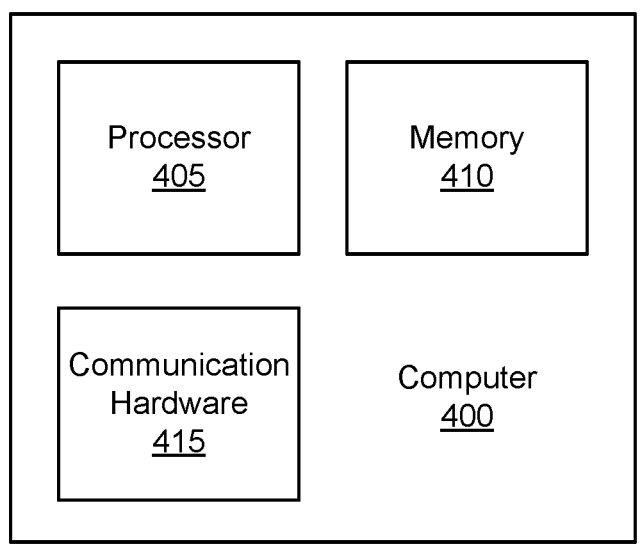
FIG. 4 is a schematic block diagram illustrating one embodiment of a computer.

FIG. 4 is a schematic block diagram illustrating one embodiment of a computer 400. In the depicted embodiment, the computer 400 includes a processor 405, a memory 410, and communication hardware 415. In one embodiment, the memory 410 includes a semiconductor storage device, hard disk drive, an optical storage device, a micromechanical storage device, or combinations thereof. The memory 410 stores code. The processor 405 executes the code. The communication hardware 415 communicates with other devices.

Figure 5A:
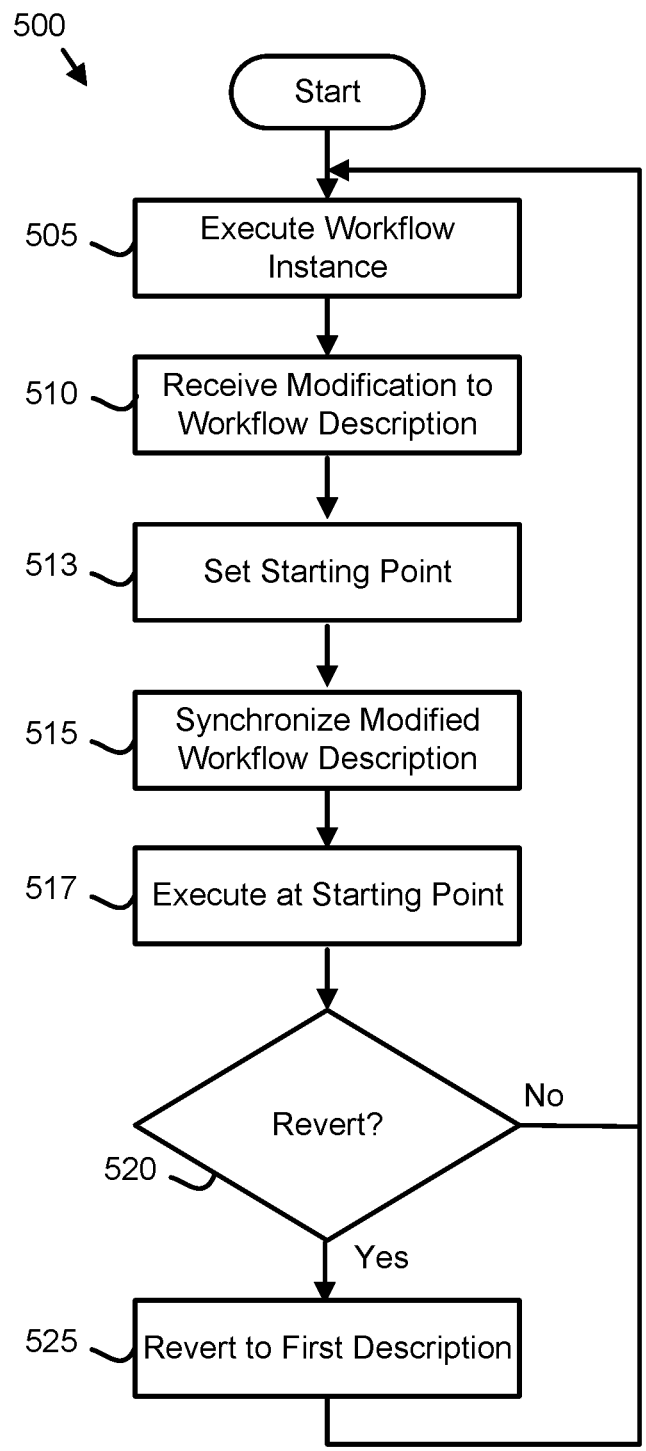
FIG. 5A is a schematic flow chart diagram illustrating one embodiment of a workflow test method.

FIG. 5A is a schematic flow chart diagram illustrating one embodiment of a workflow test method 500. The method 500 tests new, deleted, and/or modified jobs 105 in workflow steps 203 of a workflow instance 100 without restarting the workflow instance 100. The method 500 may be performed by one or more computers 400 and/or one or more processors 405 of the computers 400.

The method 500 starts, and in one embodiment, the processor 405 executes 505 the workflow instance 100. In a certain embodiment, the processor 405 concurrently executes 505 a plurality of workflow instances 100. The workflow instance 100 has a unique workflow identifier 201 as defined by a first workflow description 110. In a certain embodiment, the processor 405 executes each job 105 specified by the workflow steps 203 of the workflow description 110.

In one embodiment, the processor 405 receives 510 a modification to the workflow description 110 as the workflow instance 100 executes. In a certain embodiment, the modification is a modification to a job 105 specified in a workflow step 203. The modification to the job 105 may comprise one or more of a change in interdependencies between workflow steps 203, a change in executable workflow steps 203, and the like. In one embodiment, the modification is the addition of a job 105 as a new workflow step 203. In a particular embodiment, the modification is the removal of a workflow step 203 and a corresponding job 105 from the workflow description 110. In one embodiment, the processor 405 receives 510 the modification from the user. In an alternative embodiment, the processor 405 receives 510 the modification from an automated administrator.

In one embodiment, the processor 405 sets 513 a starting point 330 for resuming execution of the workflow instance 100 after synchronizing the modified workflow description 110. In a certain embodiment, the starting point 330 is set 513 to preserve the context of the workflow instance 100. In a particular embodiment, the starting point 330 is set 513 manually. In one embodiment, the start point 330 is set 513 at the workflow step 203 where the workflow instance 100 is paused for synchronization. In a certain embodiment, the starting point 330 is set 513 at a last workflow step 203 executed before synchronization is complete. Alternatively, no starting point 330 is set.

In one embodiment, the processor 405 synchronizes 515 the modified workflow description 110 as the workflow instance 100 executes. The workflow context of the executing workflow instance 100 is preserved during the synchronization. In one embodiment, the workflow context includes variables that are set by finishing workflow steps 203 and/or jobs 105.

In a particular embodiment, the workflow context includes an error setting. The error setting may specify whether to stop all executing jobs 105 and/or workflow steps 203 as soon as one job 105 and/or workflow step 203 fails. In one embodiment, the workflow context specifies one or more directories that apply to all workflow steps 203 and/or jobs 105.

In a certain embodiment, the workflow identifier 201 of the executing workflow instance 100 does not change as a result of the synchronization 515 with the modified workflow description 110. The synchronization 515 of the modified workflow description 110 with the executing workflow instance 100 is described in more detail in FIG. 5B.

In one embodiment, the processor 405 executes 517 the workflow instance 100 from the starting point 330. In an alternate embodiment, the processor 405 executes 517 the workflow instance 100 from a last workflow step 203 completed before or after synchronization 515 was completed.

In one embodiment, the processor 405 determines 520 whether to revert to the first or original workflow description 110. In a certain embodiment, the processor 405 determines 520 to revert to the original workflow description 110 in response to a failure of the modified workflow description 110. In an alternate embodiment, the processor 405 reverts to the first workflow description 110 in response to a user command.

If the processor 405 determines not to revert, the processor 405 continues to execute 505 the workflow instance 100. If the processor 405 determines 520 to revert, the processor 405 reverts 525 to the first workflow description 110 by synchronizing the first workflow description 110 with the executing workflow instance 100.

Figure 5B:
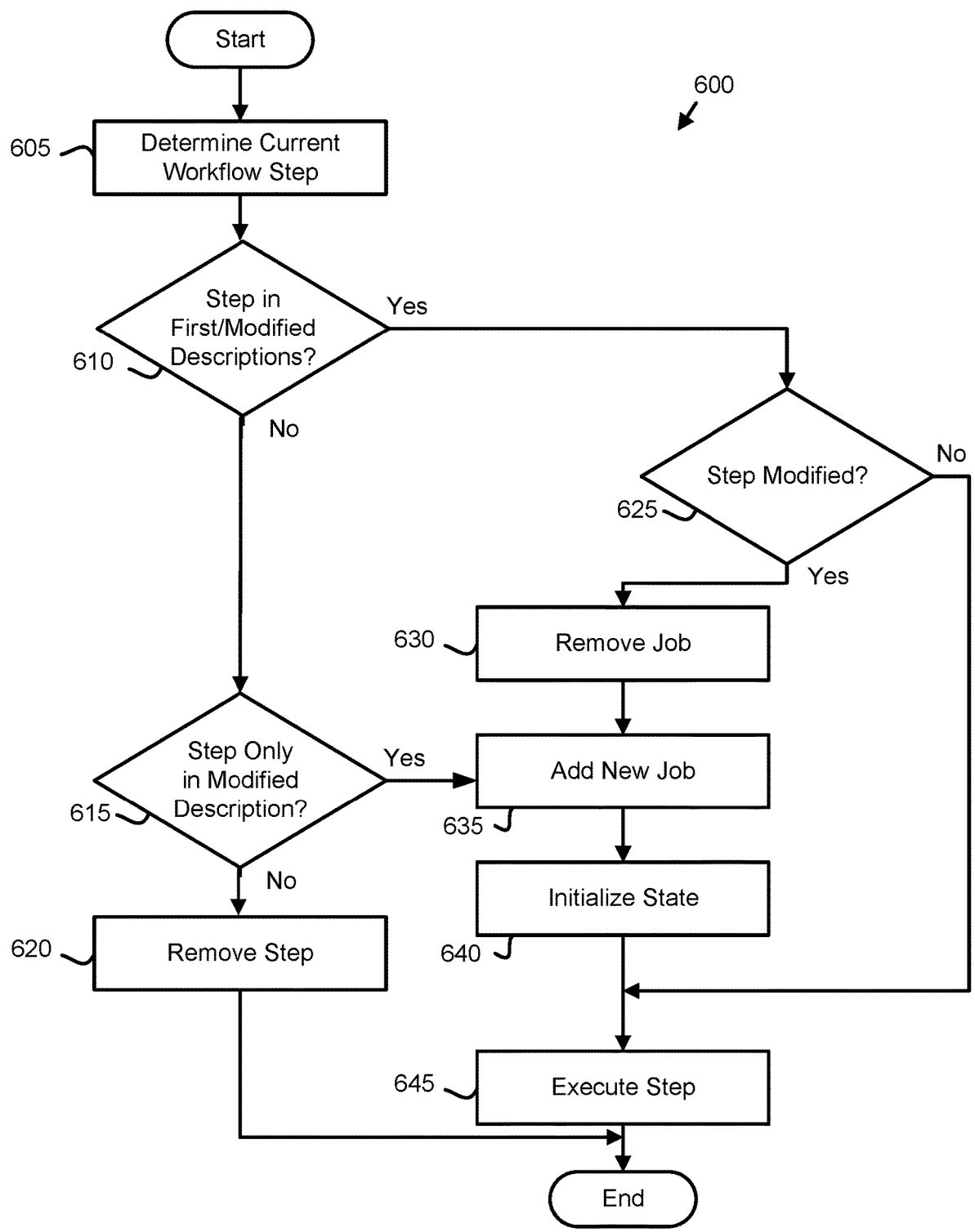
FIG. 5B is a schematic flow chart diagram illustrating one embodiment of a synchronization method.

FIG. 5B is a schematic flow chart diagram illustrating one embodiment of a synchronization method 600. The method 600 synchronizes a modified workflow description 110 with an executing workflow 100. The method 600 may be performed by one or more computers 400 and/or one or more processors 405 of the computers 400.

The method 600 starts, and in one embodiment, the processor 405 determines 605 the current workflow step 203. In a certain embodiment, the processor 405 pauses execution of the workflow instance 110 to determine 605 the current workflow step 203. The processor 405 may set a starting point 330 at the current workflow step 203. In an alternative embodiment, the processor 405 queries for the current workflow step 203.

In one embodiment, the processor 405 determine 610 if the current workflow step 203 is in both the first workflow description 110 and the modified workflow description 110. The processor 405 may determine the status of the current workflow step 203 in the first workflow description 110 and the modified workflow description 110 by comparing the step names for the current workflow step 203 in the first workflow description 110 and the modified workflow description 110. If the step name for the current workflow step 203 is in both the first workflow description 110 and the modified workflow description 110, the processor 405 determines 625 if the job 105 of the current workflow step 203 is modified.

If the job 105 of the current workflow step 203 is not modified, the processor 405 executes 645 the job 105 of the current workflow step 203 and the method 600 ends. If the job 105 of the current workflow step 203 is modified, the processor 405 removes 630 the job 105 of the current workflow step 203 from the executing workflow instance 100. In one embodiment, the processor 405 adds 635 the modified job 105 of the current workflow step 203 to the executing workflow instance 100. The processor 405 further initializes 640 a state of the new job 105 based on the state of the executing workflow instance 100. In addition, the processor 405 executes 645 the new job 105 of the current workflow step 203 in response to dependencies of the new job 105 being satisfied and the method 600 ends.

In one embodiment, if the job 105 of the current workflow step 203 is modified with an unmodified job name, the processor 405 reruns the modified job 105, executing the workflow step 203 of the modified job 105 when the interdependencies for the modified job 105 are satisfied. The processor 405 may rerun the modified job 105 of the current workflow step 203 if key attributes of the modified job 105 and/or current workflow step 203 have been modified. In one embodiment, if one or more of a job command, job environment variables, and job inputs of the job 105 are modified but do not affect job execution, the processor 405 does not rerun the modified job 105 of the current workflow step 203. If one or more of the job command, job environment variables, and job inputs of the job 105 are modified and affect job execution, the processor 405 reruns the modified job 105 of the current workflow step 203.

In one embodiment, the user is provided with an option whether to rerun the modified job 105 of the current workflow step 208. In a certain embodiment, the processor 405 may rerun all modified workflow steps 203. In an alternate embodiment, the user may specify which modified workflow steps 203 to rerun. In a certain embodiment, the processor 405 reruns modified workflow steps 203 from a starting point 330.

If the current workflow step 203 is not in both the first workflow description 110 and the modified workflow description 110, the processor 405 determines 615 if the current workflow step 203 is only in the modified workflow description 110. If the current workflow step 203 is not in the first workflow description 110, the processor 405 removes 620 the current workflow step 203 and corresponding job 105 from the executing workflow instance 100 and the method 600 ends.

If the current workflow step 203 is only in the modified workflow description 110, the processor 405 adds 635 the job 105 of the current workflow step 203 to the executing workflow instance 100. In addition, the processor 405 initializes 640 a state of the job 105 based on the state of the executing workflow instance 100. The processor 405 further executes the job 105 of the current workflow step 203 in response to dependencies of the new job 105 being satisfied and the method 600 ends.

The embodiments synchronize a modified workflow description 110 to an executing workflow instance 100 as the workflow instance 100 executes. The embodiments preserve the workflow context of the executing workflow instance 100 so that modified jobs 105 and/or workflow steps 203 of the modified workflow description 110 may be tested without restarting the workflow instance 100. As a result, modifications to the workflow instance 100 are more efficiently tested.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a computer-readable storage media storing code executable by the processor to:
execute a workflow instance, wherein the workflow instance comprises a first workflow description of step names for a plurality of jobs;
receive a modification to the first workflow description specifying a new step name for a new job as the workflow instance executes; and
synchronize the modified workflow description to the executing workflow instance as the workflow instance executes by adding the new step name to the executing workflow instance, initializing a state of the new job, and executing the workflow instance from a last workflow step completed before the synchronization in response to dependencies of the new job being satisfied, wherein a workflow context of the executing workflow instance is preserved.

2. The apparatus of claim 1, wherein synchronizing the modified workflow description comprises:
determining a current workflow step; and
in response to a given job of the current workflow step being in the modified workflow description, executing the given job.

3. The apparatus of claim 2, wherein synchronizing the modified workflow description comprises in response to the given job of the current workflow step being modified with an unmodified job name, rerunning the executing workflow instance with the modified given job.

4. The apparatus of claim 2, wherein synchronizing the modified workflow description comprises in response to the given job not being in the modified workflow description, removing the given job from the executing workflow instance.

5. The apparatus of claim 1, wherein a workflow identifier of the workflow description is the workflow identifier of the modified workflow description.

6. The apparatus of claim 1, wherein the processor further reverts to the first workflow description.

7. A method for workflow test comprising:
executing, by use of a processor, a workflow instance, wherein the workflow instance comprises a first workflow description of step names for a plurality of jobs;
receiving a modification to the first workflow description specifying a new step name for a new job as the workflow instance executes; and
synchronizing the modified workflow description to the executing workflow instance as the workflow instance executes by adding the new step name to the executing workflow instance, initializing a state of the new job, and executing the workflow instance from a last workflow step completed before the synchronization in response to dependencies of the new job being satisfied, wherein a workflow context of the executing workflow instance is preserved.

8. The method of claim 7, wherein synchronizing the modified workflow description comprises:
   determining a current workflow step; and
   in response to a given job of the current workflow step being in the modified workflow description, executing the given job.

9. The method of claim 8, wherein synchronizing the modified workflow description comprises in response to the given job of the current workflow step being modified with an unmodified job name, rerunning the executing workflow instance with the modified given job.

10. The method of claim 8, wherein synchronizing the modified workflow description comprises in response to the given job not being in the modified workflow description, removing the given job from the executing workflow instance.

11. The method of claim 7, wherein a workflow identifier of the workflow description is the workflow identifier of the modified workflow description.

12. The method of claim 7, the method further comprising reverting to the first workflow description.

13. A computer program product comprising a computer-readable storage medium having program instructions embodied therewith, the program instructions readable/executable by a processor to cause the processor to:
   execute a workflow instance, wherein the workflow instance comprises a first workflow description of step names for a plurality of jobs;
   receive a modification to the first workflow description specifying a new step name for a new job as the workflow instance executes; and
   synchronize the modified workflow description to the executing workflow instance as the workflow instance executes by adding the new step name to the executing workflow instance, initializing a state of the new job, and executing the workflow instance from a last workflow step completed before the synchronization in response to dependencies of the new job being satisfied, wherein a workflow context of the executing workflow instance is preserved.

14. The computer program product of claim 13, wherein synchronizing the modified workflow description comprises:
   determining a current workflow step; and
   in response to a given job of the current workflow step being in the modified workflow description, executing the given job.

15. The computer program product of claim 14, wherein synchronizing the modified workflow description comprises in response to the given job of the current workflow step being modified with an unmodified job name, rerunning the executing workflow instance with the modified given job.

16. The computer program product of claim 14, wherein synchronizing the modified workflow description comprises in response to the given job not being in the modified workflow description, removing the given job from the executing workflow instance.

17. The computer program product of claim 13, wherein a workflow identifier of the workflow description is the workflow identifier of the modified workflow description.

* * * * *